US011797906B2

(12) United States Patent
Liao et al.

(10) Patent No.: US 11,797,906 B2
(45) Date of Patent: Oct. 24, 2023

(54) STATE ESTIMATION AND SENSOR FUSION SWITCHING METHODS FOR AUTONOMOUS VEHICLES

(71) Applicant: Industrial Technology Research Institute, Hsinchu (TW)

(72) Inventors: Xin-Lan Liao, Taichung (TW); Kun-Hsien Lin, Taichung (TW); Lih-Guong Jang, Hsinchu (TW); Wei-Liang Wu, Taichung (TW); Yi-Yuan Chen, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 53 days.

(21) Appl. No.: 16/718,193

(22) Filed: Dec. 18, 2019

(65) Prior Publication Data

US 2021/0188315 A1    Jun. 24, 2021

(51) Int. Cl.

| | | |
|---|---|---|
| *B60W 60/00* | (2020.01) | |
| *G06F 18/25* | (2023.01) | |
| *G06V 10/80* | (2022.01) | |
| *G06V 20/56* | (2022.01) | |
| *G06Q 10/083* | (2023.01) | |

(52) U.S. Cl.
CPC ....... *G06Q 10/083* (2013.01); *B60W 60/0011* (2020.02); *B60W 60/0018* (2020.02); *B60W 60/0025* (2020.02); *G06F 18/25* (2023.01); *G06V 10/80* (2022.01); *G06V 20/56* (2022.01)

(58) Field of Classification Search
CPC ......... B60W 60/0011; B60W 60/0018; B60W 60/0025; G06K 9/6288; G06Q 10/083; G06V 10/80; G06V 20/56
See application file for complete search history.

(56) References Cited

U.S. PATENT DOCUMENTS

| | | | |
|---|---|---|---|
| 9,066,207 B2 | 6/2015 | Marti et al. | |
| 9,642,110 B2 | 5/2017 | Liu et al. | |
| 10,073,456 B2 | 9/2018 | Mudalige et al. | |
| 11,200,531 B1 * | 12/2021 | Brady | G06Q 50/28 |

(Continued)

FOREIGN PATENT DOCUMENTS

| | | |
|---|---|---|
| CN | 103517361 | 7/2016 |
| CN | 104427108 | 2/2017 |

(Continued)

*Primary Examiner* — James J Lee
*Assistant Examiner* — Alexander George Matta
(74) *Attorney, Agent, or Firm* — JCIPRNET

(57) ABSTRACT

State estimation and sensor fusion switching methods for autonomous vehicles thereof are provided. The autonomous vehicle includes at least one sensor, at least one actuator and a processor, and is configured to transfer and transport an object. In the method, a task instruction for moving the object and data required for executing the task instruction are received. The task instruction is divided into a plurality of work stages according to respective mapping locations, and each of the work stages is mapped to one of a transport state and an execution state, so as to establish a semantic hierarchy. A current location of the autonomous vehicle is detected by using the sensor and mapped to one of the work stages in the semantic hierarchy, so as to estimate a current state of the autonomous vehicle.

12 Claims, 6 Drawing Sheets

| Transport | Sensor |
|---|---|
| 1 | GPS, basestation |
| 2 | Photodetector, IMU, rotary encoder |
| ... | |
| n | WiFi, IMU, rotary encoder |

| Execution | Sensor |
|---|---|
| 1 | Camera |
| 2 | Laser |
| ... | |
| m | RFID |

(56) References Cited

U.S. PATENT DOCUMENTS

| | | | |
|---|---|---|---|
| 2011/0301800 A1* | 12/2011 | Furuno | G05D 1/0274 |
| | | | 701/25 |
| 2012/0059545 A1* | 3/2012 | Furuno | G05D 1/0234 |
| | | | 701/26 |
| 2018/0112997 A1* | 4/2018 | Fasola | G01C 21/3407 |
| 2018/0196442 A1* | 7/2018 | Wang | G05D 1/0246 |
| 2018/0261095 A1 | 9/2018 | Qiu et al. | |
| 2019/0042859 A1* | 2/2019 | Schubert | G05D 1/00 |
| 2020/0338763 A1* | 10/2020 | Tang | B66F 9/0755 |
| 2021/0331692 A1* | 10/2021 | Park | H04W 4/40 |

FOREIGN PATENT DOCUMENTS

| | | |
|---|---|---|
| CN | 106767821 | 5/2017 |
| TW | I442019 | 6/2014 |

* cited by examiner

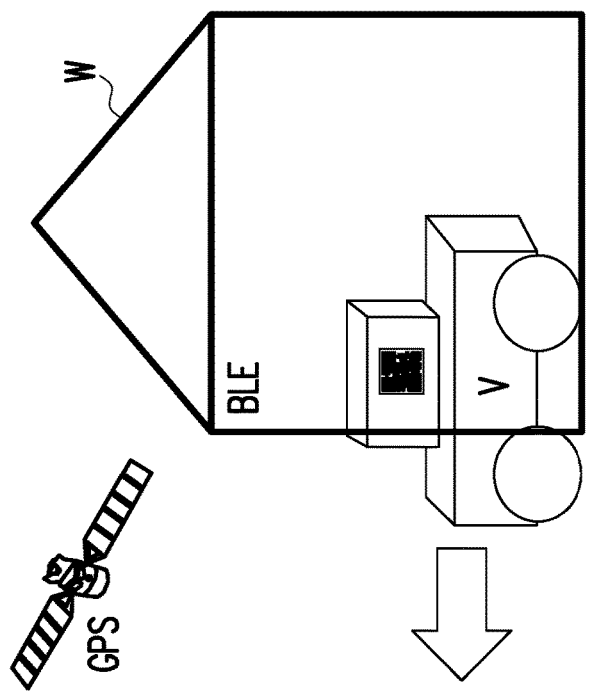
FIG. 5C
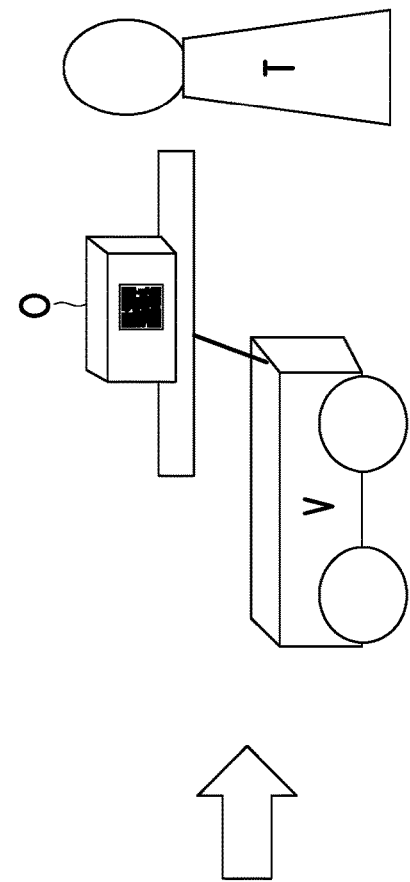
FIG. 5D
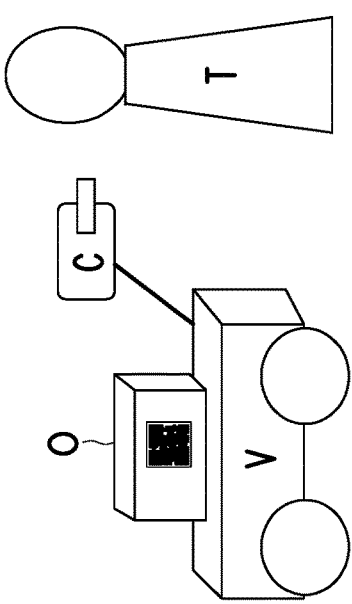

STATE ESTIMATION AND SENSOR FUSION SWITCHING METHODS FOR AUTONOMOUS VEHICLES

TECHNICAL FIELD

The disclosure relates to a method for detecting device states, and relates to state estimation and sensor fusion switching methods for an autonomous vehicle thereof.

BACKGROUND

Automated Guided Vehicle (AGV) is a mobile robot that can move goods in factories and warehouses through technologies such as floor wires, machine vision, or laser navigation. Because AGV can automatically load, unload and transport goods to make loading and unloading more labor-saving and can flexibly adjust loading and unloading sites and transport paths, problems regarding poor delivery efficiency and lane occupation may be solved accordingly.

AGV relies on positioning, object recognition and other technologies to move goods. In recent years, a variety of positioning technologies have emerged, such as Bluetooth, WiFi, Ultra-Wideband (UWB), Visible Light Positioning System, Radio Frequency Identification (RFID), etc. Depending on deployment costs, accuracy, and technical characteristics, each of these positioning technologies has its own field of application. Due to the diversity of positioning technologies, the design of seamless indoors and outdoors positioning is difficult to achieve simply by switching between dual systems.

SUMMARY

The disclosure aims to provide an autonomous vehicle and a state estimation and sensor fusion switching method thereof, which can realize a seamless switching between multiple positioning systems.

The disclosure provides a state estimation and sensor fusion switching methods for an autonomous vehicle. The autonomous vehicle includes at least one sensor, at least one actuator and a processor, and is configured to transfer and transport an object. In the method, a task instruction for moving the object and data required for executing the task instruction are received. The task instruction is divided into a plurality of work stages according to respective mapping locations, and each of the work stages is mapped to one of a transport state and an execution state, so as to establish a semantic hierarchy. A current location of the autonomous vehicle is detected by using the sensors and mapped to one of the work stages in the semantic hierarchy, so as to estimate a current state of the autonomous vehicle.

The disclosure provides an autonomous vehicle, which includes a data extracting device, at least one sensor, at least one actuator, a storage device and a processor. Among them, the sensor is configured to detect a current location of the autonomous vehicle. The actuator is configured to transfer and transport an object. The storage device is configured to store data extracted by the data extracting device and a plurality of computer instructions or programs. The processor is coupled to the data extracting device, the sensor, the actuator and the storage device, and configured to execute the computer instructions or the programs to: receive a task instruction for moving the object and data required for executing the task instruction by using the data extracting device; divide the task instruction into a plurality of work stages according to respective mapping locations, and map each of the work stages to one of a transport state and an execution state, so as to establish a semantic hierarchy; and map the current location detected by the sensor to one of the work stages in the semantic hierarchy, so as to estimate a current state of the autonomous vehicle.

According to the autonomous vehicle and the state estimation and sensor fusion switching method of the disclosure, the task instruction is divided into multiple work stages to be mapped to different states in order to establish the semantic hierarchy. When executing the task for transferring and transporting the object, the autonomous vehicle may map the detected location to the current state and determine whether the state transition occurs, and quickly switch to the sensor combination suitable for the current state when the state transition occurs, so as to continue executing the task instruction. As a result, the state estimation and sensor fusion switching for the autonomous vehicle can be performed efficiently to realize a seamless switching between the positioning systems.

To make the aforementioned more comprehensible, several embodiments accompanied with drawings are described in detail as follows.

BRIEF DESCRIPTION OF THE DRAWINGS

FIG. 5A to FIG. 5D are examples of a sensor fusion switching method illustrated according to an embodiment of the disclosure.

DETAILED DESCRIPTION

The embodiments of the disclosure are to design a common architecture for an autonomous guided vehicle (AGV). Here, a received task instruction is divided into multiple work stages according to respective mapping locations to establish a semantic hierarchy. Then, each of the work stages is mapped to a state layer along with the semantic hierarchy according to a sequence and a connection relationship between the work stages, so as to establish a state transition model. In a real-time operation, the autonomous guided vehicle may detect its current location and map the location to the semantic hierarchy in order to estimate a current state. In addition, the autonomous guided vehicle may compare a difference between the current state and a previous state to determine whether a state transition occurs, and may re-prioritize a priority sequence of sensors when the state transition occurs, so as to efficiently switch to a control thread suitable for the current state to continue executing a moving task.

Figure 1:
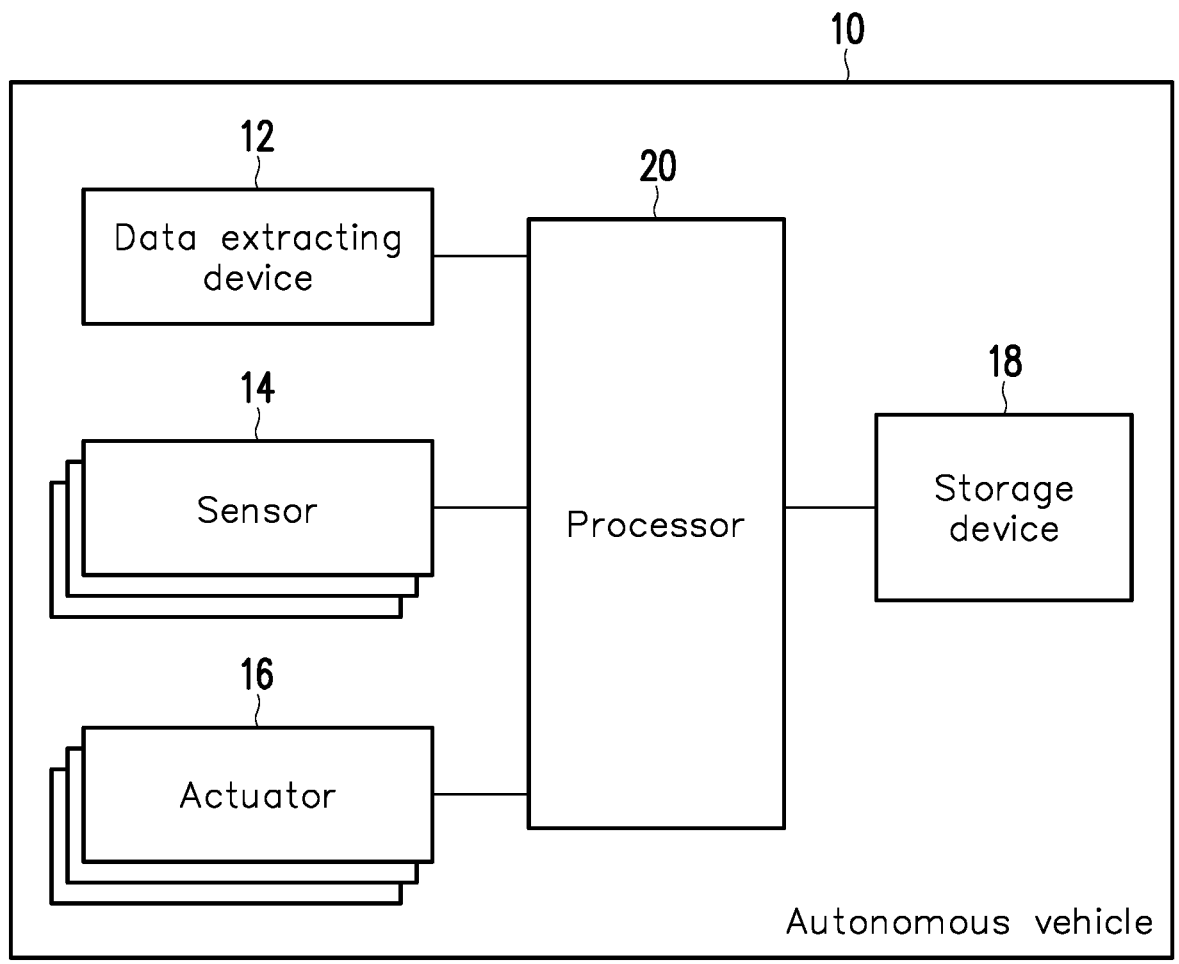
FIG. 1 is a block diagram of an autonomous vehicle illustrated according to an embodiment of the disclosure.

FIG. 1 is a block diagram of an autonomous vehicle illustrated according to an embodiment of the disclosure. Referring to FIG. 1, an autonomous vehicle 10 of the present embodiment is, for example, an electronic apparatus for transferring and transporting an object, such as the autonomous guided vehicle, the mobile robot or the like. The autonomous vehicle 10 includes a data extracting device 12, at least one sensor 14, at least one actuator 16, a storage device 18 and a processor 20, and their functions are described as follows.

The data extracting device 12 is, for example, an interface device such as a universal serial bus (USB) interface, a Firewire interface, a Thunderbolt interface, a card reader or the like, which may be used to connect external devices (such as a flash drive, a mobile hard disk, or a memory card) to extract data. In another embodiment, the data extracting device 12 is, for example, an input tool such as a keyboard, a mouse, a touchpad, or a touch screen, and is used to detect an input operation of a user and extract input data. In another embodiment, the data extracting device 12 is, for example, a network card in compliance with a wired network connection (e.g., Ethernet) or a wireless network card in compliance with a wireless communication standard (e.g., institute of electrical and electronics engineers (IEEE) 802.11n/b/g), which may conduct a network connection with the external devices in a wired or wireless manner and extract data.

The sensor 14 is, for example, a wireless communication subsystem, a global position system (GPS), a Bluetooth Low Energy (BLE), an inertial measurement unit (IMU), a rotary encoder, a camera, a photodetector, a laser or a combination thereof, and may sense environmental information such as electromagnetic waves, images and sound waves around the autonomous vehicle 10 as well as inertia and displacement of the autonomous vehicle 10 and provide the detected information to the processor 20 for estimating a current location and/or a state of the autonomous vehicle 10. In an embodiment, the sensor 14 may improve accuracy for estimating the location of the autonomous vehicle 10 in cooperation laser mapper or odometry systems.

The actuator 16 is, for example, a fork, an arm, a roller, a motor or a combination thereof (which may constitute a fork-arm type moving system), and may perform operations including a loading, an unloading and a transport on the object according to control instructions or signals provided by the processor 20.

The storage device 18 may be a fixed or a movable device in any possible forms, including a random access memory (RAM), a read-only memory (ROM), a flash memory or other similar elements, or a combination of the above-mentioned elements. In this embodiment, the storage device 18 is configured to store data extracted by the data extracting device 12 and computer instructions or programs that can be accessed and executed by the processor 20. Among them, the data extracted by the data extracting device 12 includes a task instruction and data required for executing the task instruction, such as map data, identification information or the like. The processor 20 may use the map data to perform a location estimation, and use the identification information to perform an identification operation on a transfer object, loading or unloading sites, and loading or unloading targets. An identification method of the loading target and the unloading target includes a biological feature, an object feature, an environmental feature or an identification code, but not limited thereto.

The processor 20 is, for example, a central processing unit (CPU) or a graphics processing unit (GPU) or other programmable devices for general purpose or special purpose such as a microprocessor and a digital signal processor (DSP), a programmable controller, an application specific integrated circuit (ASIC), a programmable logic device (PLD) or other similar devices or a combination of above-mentioned devices. The processor 20 is connected to the data extracting device 12, the sensor 14, the actuator 16 and the storage device 18, and loads in the computer instructions or programs from the storage device 18 to accordingly execute the state estimation and sensor fusion switching method for the autonomous vehicle of the disclosure. Various embodiments are provided below and served to describe detailed step of said method.

Figure 2:
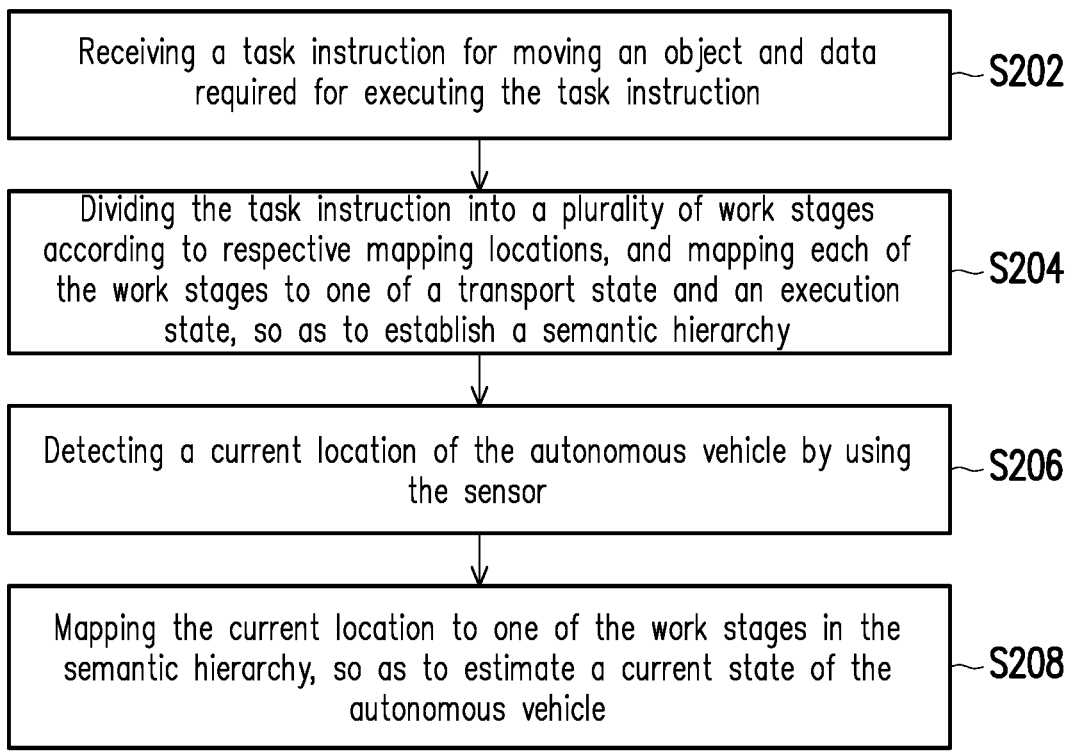
FIG. 2 is a flowchart of a state estimation and sensor fusion switching method for an autonomous vehicle illustrated according to an embodiment of the disclosure.

FIG. 2 is a flowchart of a state estimation and sensor fusion switching method for an autonomous vehicle illustrated according to an embodiment of the disclosure. Referring to FIG. 1 and FIG. 2 together, the method of the present embodiment is applicable to the autonomous vehicle 10 of FIG. 1. The following detailed steps are elaborated to describe the state estimation and sensor fusion switching method of the disclosure with the reference to each element of the autonomous vehicle 10.

In step S202, the processor 20 receives a task instruction for moving the object and data required for executing the task instruction by using the data extracting device 12. Here, the task instruction is given by, for example, a plant manager, and is configured to instruct the autonomous vehicle 10 to perform transfer and transport operations on objects in plant. In an embodiment, the processor 20 stores, for example, frequently read or about-to-use data (e.g., the map data of nearby area, the objects to be moved, the loading or unloading sites, or the identification information of the loading or unloading targets) in the storage device 18 for the processor 20 to access and use.

In step S204, the processor 20 divides the task instruction into a plurality of work stages according to respective mapping locations, and maps each of the work stages to one of a transport state and an execution state, so as to establish a semantic hierarchy. Here, the task instruction is composed of at least one of tasks including a loading, an unloading and a transport, and the processor 20 makes the tasks respectively corresponding to at least one control thread, and divides the work stages according to the control thread, for example. Here, the loading and the unloading divide the work stages according to the loading site, the unloading site, the transfer object and identifications of the loading target and the unloading target, for example. The task of the transport divides, for example, the work stages according to a respective geographic information system of at least one site being passed during the transport.

In one embodiment, the processor 20 classifies states of the autonomous vehicle 10 into two types: a transport state or an execution state. In the transport state, the processor 20 sets up a path by using a path planning module (a path planner), for example. The path planning module plans the path by constructing a visibility map according to the method proposed by Ghosh and Mount, uses a shortest path algorithm such as Dijkstra's algorithm to calculate an optimal path based on edges of the visibility map, and generates low-level instructions for controlling the motor of the autonomous vehicle 10 to adjust direction and speed, so as to tack the planned path. During the transport, the processor 20 continuously detects the surrounding environment by using the sensor 14 and confirms whether the autonomous vehicle 10 moves according to the path. When an obstacle is detected, the processor 20 controls the motor to slow down or stop according to ranging data, and at the same time uses the laser mapper system to map a shape of the obstacle and outputs it to the path planning module in order to plan an obstacle avoidance path. On the other hand, in the execution state, the processor 20, for example, activates the camera to identify the loading/unloading targets, and controls a transfer machine to load/unload the object.

In detail, the state estimation and sensor fusion switching method for the autonomous vehicle in this embodiment establishes the semantic hierarchy to empower cognitive systems when performing a state analysis. Here, the semantic hierarchy may be dynamically established based on the task instruction, which includes three layers: mapping location, work stage and state.

Figure 3:
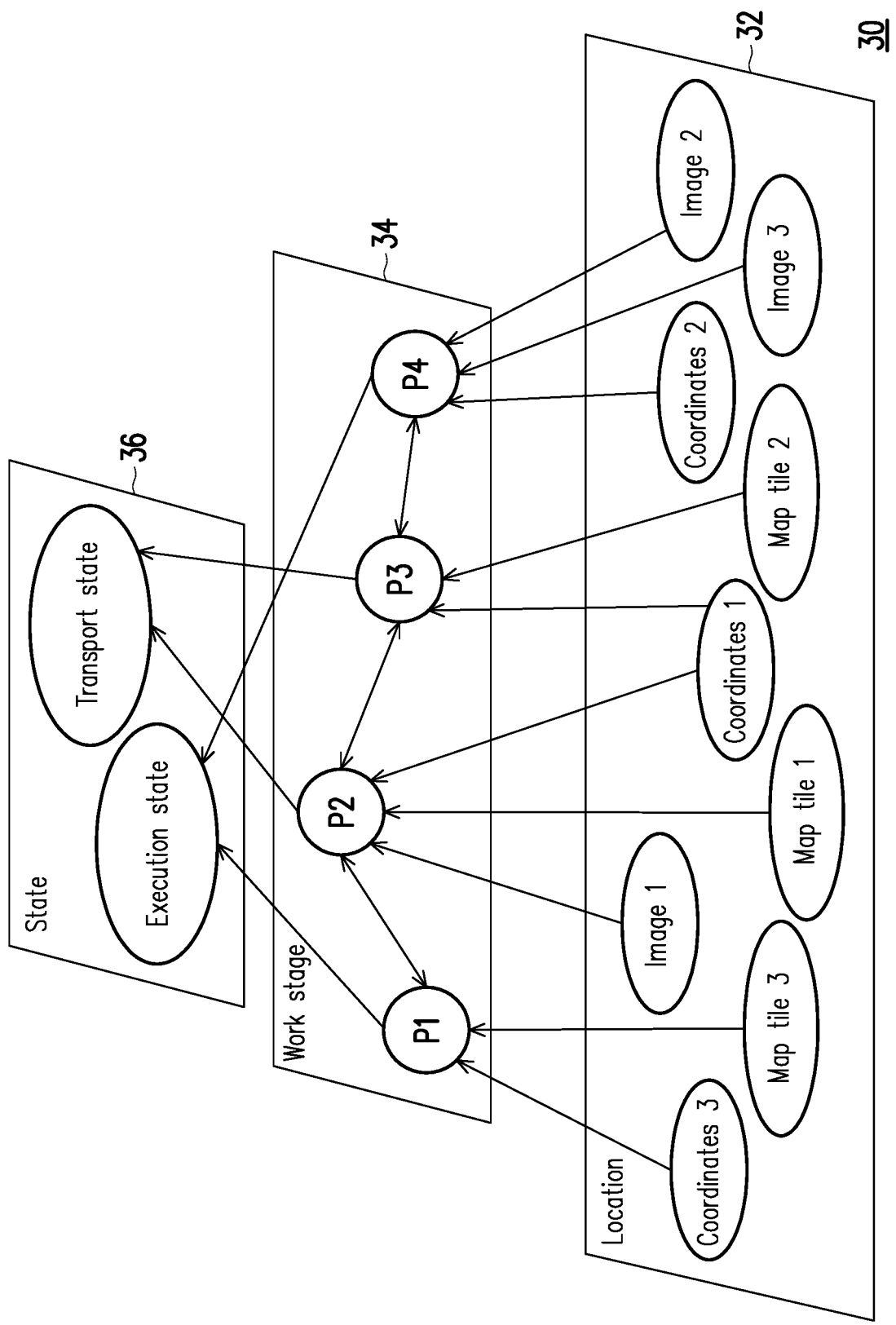
FIG. 3 is a schematic diagram of a semantic hierarchy illustrated according to an embodiment of the disclosure.

For instance, FIG. 3 is a schematic diagram of a semantic hierarchy illustrated according to an embodiment of the disclosure. Referring to FIG. 3, a semantic hierarchy 30 includes a mapping location layer 32, a work stage layer 34 and a state layer 36. Among them, the mapping location layer 32 includes coordinates 1 to 3, map tiles 1 to 3 and images 1 to 3 (of the transfer sites/targets). The work stage layer 34 includes multiple work stages including, for example, a loading P1, transports P2 and P3 and an unloading P4. Each mapping position in the mapping location layer 32 may be mapped to one of the loading P1, the transports P2 and P3 and the unloading P4. For example, the coordinates 3 and the map tile 3 may be mapped to the loading P1; the coordinates 2, the image 2 and the image 3 may be mapped to the unloading P4; and so on and so forth. The state layer 36 includes the execution state and the transport state, wherein the loading P1 and the unloading P4 may be mapped to the execution state, and the transports P2 and P3 may be mapped to the transport state. Each of the execution state and the transport state may correspond to a thread of a feedback control loop. This thread is coupled to, for example, a particular one of the sensor 14 and the actuator 16 to control that particular one to execute a specific operation.

In an embodiment, for example, after establishing the semantic hierarchy, according to a sequence and a connection relationship between the work stages, the processor 20 further maps each of the work stages along with the semantic hierarchy to one of the transport state and the execution state, so as to form a state transition model.

Figure 4:
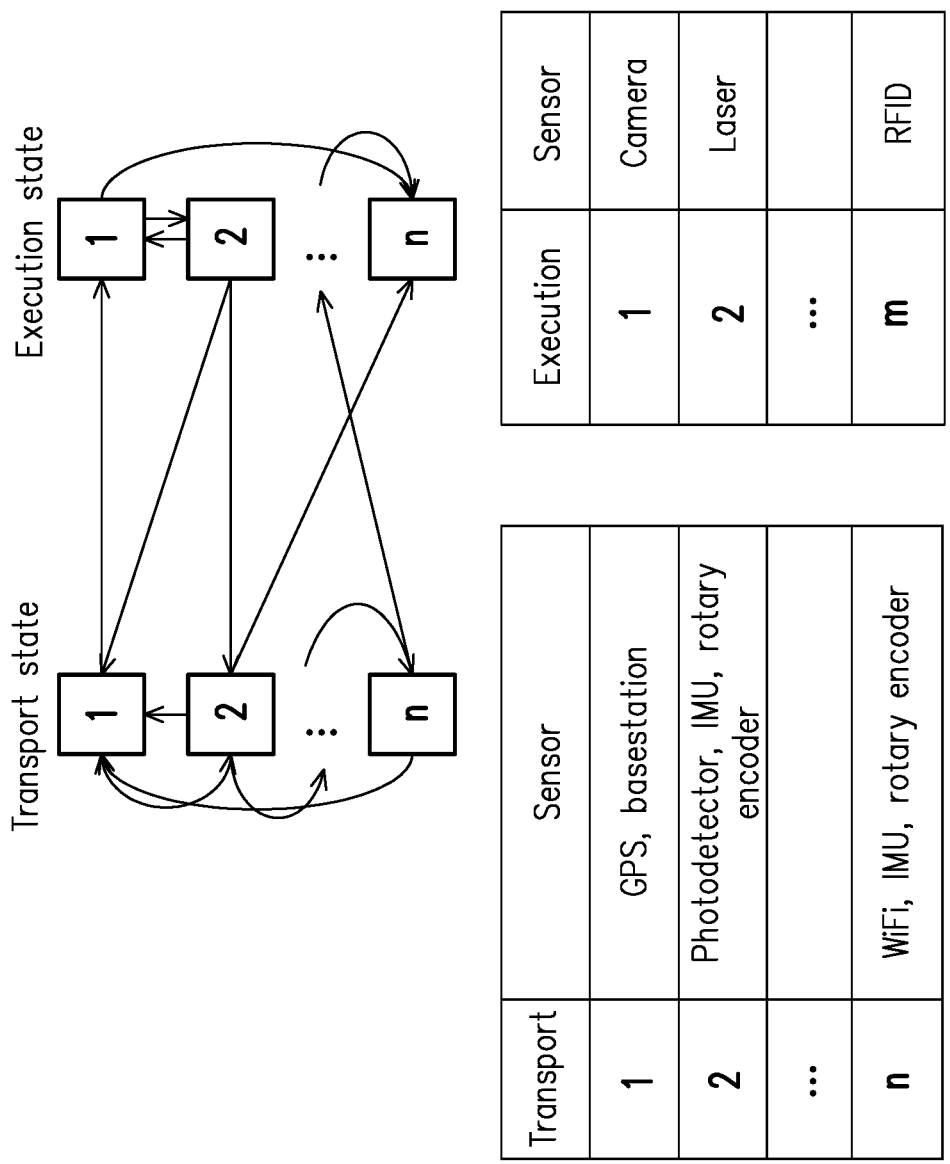
FIG. 4 is a schematic diagram of a state transition model illustrated according to an embodiment of the disclosure.

For instance, FIG. 4 is a schematic diagram of a state transition model illustrated according to an embodiment of the disclosure. Referring to FIG. 4, a state transition model 40 defines, for example, transitions between various work states under the transportation state and the execution state in the semantic hierarchy. That is to say, the state transition model 40 maps the transitions between the work phases to the transitions between the states. Taking FIG. 4 as an example, the state transition model 40 records the transitions between work stages 1 to n mapped to the transport state, the transitions between work stages 1 to m mapped to the execution state, and the transitions between the work stages 1 to n and the work stages 1 to m. A table on the bottom left records the sensors and the actuators coupled to the work stages 1 to n mapped to the transport state, and a table on the bottom right records the sensors and the actuators coupled to the work stages 1 to m mapped to the execution state. For example, the work stage 1 mapped to the transport state is coupled to a GPS and a base station; the work stage 2 mapped to the transport state is coupled to a photodetector, an inertial measurement unit (IMU), a rotary encoder; and so on and so forth.

After the semantic hierarchy and the state transition model are established, in the real-time operation, the autonomous vehicle 10 can detect its current location and map the location to the semantic hierarchy in order to estimate a current state.

Specifically, in step S206, the processor 20 detects a current location of the autonomous vehicle 10 by using the sensor 14. Here, the processor 20 may, for example, use a positioning device such as the GPS or the base station to detect an outdoor location, or use a positioning device such as the photodetector or the laser to detect an indoor location, which is not limited herein.

Lastly, in step S208, the processor 20 maps the current location to one of the work stages in the semantic hierarchy, so as to estimate the current state of the autonomous vehicle 10. Taking FIG. 3 as an example, after obtaining the coordinates 3 by detecting the current location of the autonomous vehicle 10, the processor 20 may map the coordinates 3 to the loading P1 in the work stage through the semantic hierarchy 30, and then map the loading P1 to the execution state. In this way, according to the estimated current state, the processor 20 may have the corresponding sensors and actuators coupled to perform primary behaviors or skills.

After estimating the current state of the autonomous vehicle 10, the processor 20 compares, for example, the current state with a previous state estimated at a previous time point, so as to determine whether a state transition occurs. Here, when determining that the state transition occurs, the processor 20 sequentially switches to a plurality of sensor combinations under the state transition according to the state transition model, so as to select the sensor combination available to continue executing the task instruction. Each of the sensor combinations includes at least one of the sensor and/or the actuator. With the priority sequence of the sensors re-prioritized when the state transition occurs, a control thread suitable for the current state may be efficiently switched to continue executing the task.

For instance, FIG. 5A to FIG. 5D are examples of a sensor fusion switching method illustrated according to an embodiment of the disclosure. An autonomous guided vehicle V in this embodiment is, for example, an automatic pick-up and delivery vehicle equipped with a transfer mechanism for delivering goods from a warehouse to an outdoor customer.

Figure 5A:
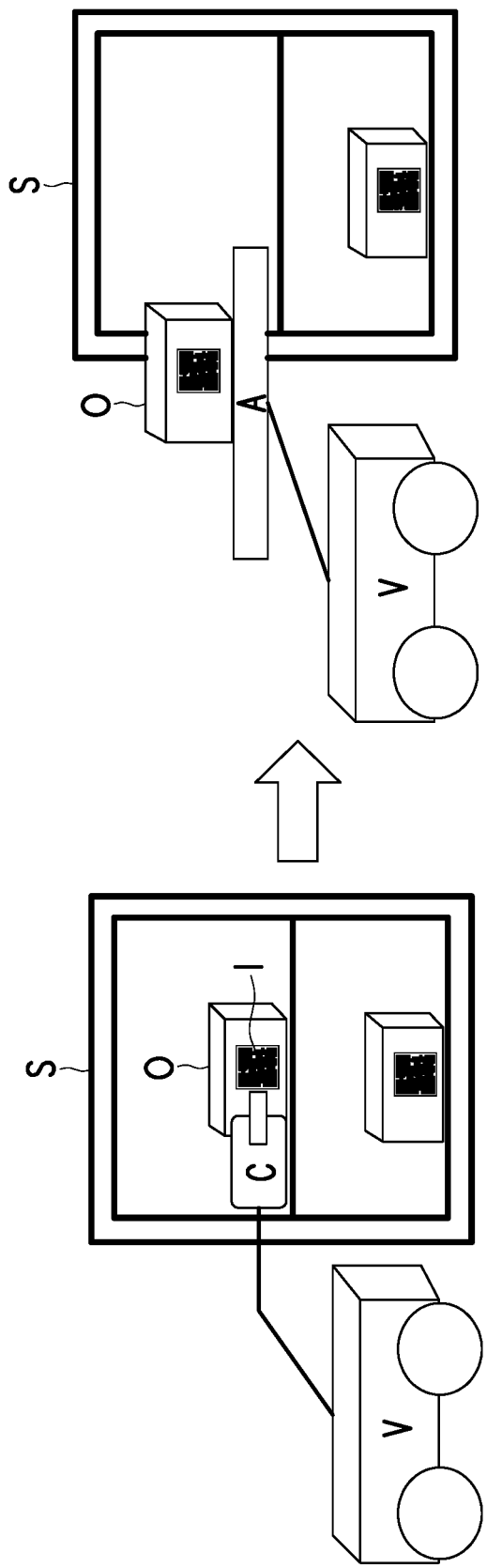

Referring to FIG. 5A, the autonomous guided vehicle V receives a task instruction for moving an object O and data required for executing the task instruction including a location of the object O on a shelf S and an identification code I of the object O (a QR code as shown in the drawing), then conducts the state analysis, and determines whether itself is located next to the shelf S. At this time, the execution state is being entered for picking up goods. Here, the autonomous guided vehicle V identifies the object O by capturing the identification code I of the object O on the shelf S using a camera C, and when confirming that the object O is the goods to be moved as instructed by the task instruction, picks up the object O by using a transfer machine A.

Figure 5B:
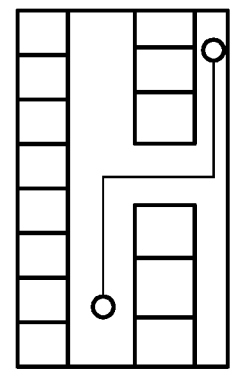
Figure 5B:
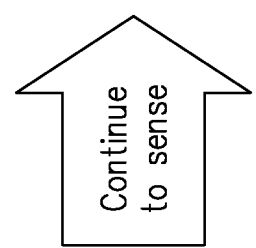
Figure 5B:
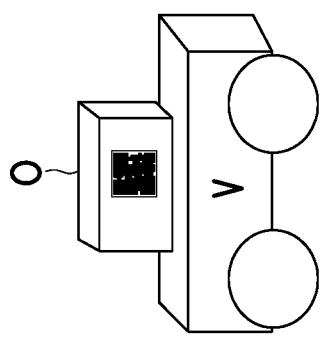

Referring to FIG. 5B, after picking up the goods, the autonomous guided vehicle V switches from the execution state to the transport state so as to activate the path planning module for planning a delivery path. Here, since the state transition is triggered during the process of switching from the execution state to the transport state, the autonomous guided vehicle V sequentially switches to the sensor combinations until the switched sensor combination matches an on-site positioning system.

For instance, Table 1 below illustrates the sensor combinations under this state transition. The autonomous guided vehicle V sequentially switches to these sensor combinations to select the sensor combination available to continue executing the task instruction. Here, the autonomous guided vehicle V first finds out that a sensor combination 1 used cannot match the on-site positioning system, then switches to a sensor combination 2, and finds out that the sensor combination 2 can match the on-site positioning system.

Accordingly, the sensor combination 2 may be directly selected and used to continue executing the task instruction.

TABLE 1

1. WiFi, IMU, rotary encoder
2. BLE, IMU, rotary encoder
3. Photodetector, IMU, rotary encoder Referring to FIG. 5C, when the autonomous guided vehicle V moves according to the planned path and is ready to move from the warehouse to the outdoors, because a state mapped to the detected current location is different from a state detected at a previous time point (i.e., the work stage is changed from the warehouse to the outdoors), the state transition is triggered again to re-prioritize the sensor combinations.

For instance, Table 2 below illustrates the sensor combinations under this state transition. As the autonomous guided vehicle V finds out that the sensor combination 1 used can match the on-site positioning system, the sensor combination 1 may be directly selected and used to continue executing the task instruction. Here, since the autonomous guided vehicle V switches according to the sequence of the sensor combinations most likely to match under this state transition (i.e., the work stage is changed from the warehouse to the outdoors), the positioning system can be efficiently and seamlessly switched.

TABLE 2

1. GPS, base station
2. BLE, IMU, rotary encoder
3. Photodetector, IMU, rotary encoder Referring to FIG. 5D, after arriving at the unloading site, by detecting the current location and mapping the detected current location to the semantic hierarchy, the autonomous guided vehicle V can estimate that the current state is the execution state. Since the state transition is triggered when switching from the transport state to the execution state, the autonomous guided vehicle V switches to the sensor combination for performing an identification operation required during the unloading.

For instance, Table 3 below illustrates the sensor combinations under this state transition. The autonomous guided vehicle V activates the camera when switching to the sensor combination 1. Because the camera supports the identification operation (e.g., a face recognition) for an unloading target T during the unloading, the autonomous guided vehicle V can directly select and use the sensor combination 1 to continue executing the task instruction. After an identity of the unloading target T is confirmed, the autonomous guided vehicle V activates the transfer machine A to hand over the object O to the unloading target T.

TABLE 3

1. Camera
2. GPS, base station
3. BLE, IMU, rotary encoder

In summary, according to the autonomous vehicle and the state estimation and sensor fusion switching method of the disclosure, the task instruction is divided into multiple work stages to be mapped to different states in order to establish the semantic hierarchy. When executing the task for transferring and transporting the object, the autonomous vehicle may map the detected location to the current state and determine whether the state transition occurs, and quickly switch to the sensor combination suitable for the current state when the state transition occurs, so as to continue executing the task instruction. As a result, the state estimation and sensor fusion switching for the autonomous vehicle can be performed efficiently to realize a seamless switching between the positioning systems.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

The invention claimed is:

1. A state estimation and sensor fusion switching method for an autonomous vehicle, the autonomous vehicle comprising at least one sensor, at least one actuator and a processor and being configured to transfer and transport an object, the method comprising following steps of:

receiving, by the processor, a task instruction for moving the object and data required for executing the task instruction;

dividing, by the processor, the task instruction into a plurality of work stages according to respective mapping locations, and mapping each of the work stages to one of a transport state in which the object is transported and an execution state in which the object is loaded or unloaded, so as to establish a semantic hierarchy;

according to a sequence and a connection relationship between the work stages, mapping, by the processor, each of the work stages along with the semantic hierarchy to one of the transport state and the execution state, so as to form a state transition model and define a plurality of sensor combinations with a priority sequence under each of a plurality of state transitions between the transport state and the execution state in the state transition model, wherein each of the sensor combinations comprises at least one of the sensor and the actuator;

detecting, by the processor, a current location of the autonomous vehicle by using the sensor;

mapping, by the processor, the current location to one of the work stages in the semantic hierarchy, so as to estimate a current state of the autonomous vehicle;

comparing, by the processor, the current state with a previous state estimated at a previous time point, so as to determine whether one of the state transitions occurs; and when determining that the state transition occurs, switching, by the processor, to a first sensor combination among the plurality of sensor combinations under the state transition according to the priority sequence defined in the state transition model to activate the at least one of the sensor and the actuator in the first sensor combination without activating the sensor and the actuator in other sensor combinations and determine whether the at least one of the sensor and the actuator in the first sensor combination matches an on-site positioning system, sequentially switching to a second sensor combination among the plurality of sensor combinations to activate the at least one of the sensor and the actuator in the second sensor combination without activating the sensor and the actuator in other sensor combinations and determine whether the at least one of the sensor and the actuator in the second sensor combination matches the on-site positioning system when the at least one of the sensor and the actuator in the first sensor combination does not match the on-site positioning system, so as to select the sensor combination having the at least one of the sensor and the actuator matching the on-site positioning system and use the selected sensor combination to continue executing the task instruction.

2. The method according to claim 1, wherein the task instruction is composed of at least one of tasks including a loading, an unloading and a transport, and the step of dividing the task instruction into the work stages according to the respective mapping locations, and mapping each of the work stages to one of the transport state and the execution state, so as to establish the semantic hierarchy comprises:

making the tasks respectively corresponding to at least one control thread, and dividing the work stages according to the control thread.

3. The method according to claim 2, wherein the loading and the unloading comprise dividing the work stages according to a loading site, an unloading site, a transfer object and identifications of a loading target and an unloading target.

4. The method according to claim 3, wherein an identification method of the loading target and the unloading target comprises a biological feature, an object feature, an environmental feature or an identification code.

5. The method according to claim 2, wherein the task of the transport comprises dividing the work stages according to a respective geographic information system of at least one site being passed during the transport.

6. The method according to claim 1, further comprising:
detecting an obstacle located on a transport path of the autonomous vehicle by using the sensor; and
when the obstacle is detected, re-planning the transport path for each of the work stages under the transport state.

7. An autonomous vehicle, comprising:
a data extracting device;
at least one sensor, configured to detect a current location of the autonomous vehicle;
at least one actuator, configured to transfer and transport an object;
a storage device, storing data extracted by the data extracting device and a plurality of computer instructions or programs; and
a processor, coupled to the data extracting device, the sensor, the actuator and the storage device, and configured to execute the computer instructions or the programs to:
receive a task instruction for moving the object and data required for executing the task instruction by using the data extracting device;
divide the task instruction into a plurality of work stages according to respective mapping locations, and map each of the work stages to one of a transport state in which the object is transported and an execution state in which the object is loaded or unloaded, so as to establish a semantic hierarchy;
according to a sequence and a connection relationship between the work stages, map each of the work stages along with the semantic hierarchy to one of the transport state and the execution state, so as to form a state transition model and define a plurality of sensor combinations with a priority sequence under each of a plurality of state transitions between the transport state and the execution state in the state transition model, wherein each of the sensor combinations comprises at least one of the sensor and the actuator;
map the current location detected by the sensor to one of the work stages in the semantic hierarchy, so as to estimate a current state of the autonomous vehicle;
compare the current state with a previous state estimated at a previous time point, so as to determine whether one of the state transitions occurs; and
when determining that the state transition occurs, switch to a first sensor combination among the plurality of sensor combinations under the state transition according to the priority sequence defined in the state transition model to activate the at least one of the sensor and the actuator in the first sensor combination without activating the sensor and the actuator in other sensor combinations and determine whether the at least one of the sensor and the actuator in the first sensor combination matches an on-site positioning system, sequentially switch to a second sensor combination among the plurality of sensor combinations to activate the at least one of the sensor and the actuator in the second sensor combination without activating the sensor and the actuator in other sensor combinations and determine whether the at least one of the sensor and the actuator in the second sensor combination matches the on-site positioning system when the at least one of the sensor and the actuator in the first sensor combination does not match the on-site positioning system, so as to select the sensor combination having the at least one of the sensor and the actuator matching the on-site positioning system and use the selected sensor combination to continue executing the task instruction.

8. The autonomous vehicle according to claim 7, wherein the task instruction is composed of at least one of tasks including a loading, an unloading and a transport, and the processor makes the tasks respectively corresponding to at least one control thread, and divides the work stages according to the control thread.

9. The autonomous vehicle according to claim 8, wherein the loading and the unloading comprise dividing the work stages according to a loading site, an unloading site, a transfer object and identifications of a loading target and an unloading target.

10. The autonomous vehicle according to claim 9, wherein an identification method of the loading target and the unloading target comprises a biological feature, an object feature, an environmental feature or an identification code.

11. The autonomous vehicle according to claim 8, wherein the task of the transport comprises dividing the work stages according to a respective geographic information system of at least one site being passed during the transport.

12. The autonomous vehicle according to claim 7, wherein the processor further detects an obstacle located on a transport path of the autonomous vehicle by using the sensor, and when the obstacle is detected, re-plans the transport path for each of the work stages under the transport state.

* * * * *